United States Patent
Chen et al.

(10) Patent No.: US 7,937,086 B2
(45) Date of Patent: *May 3, 2011

(54) METHOD AND SYSTEM FOR A HANDOFF IN A BROADCAST COMMUNICATION SYSTEM

(75) Inventors: Tao Chen, San Diego, CA (US); Jun Wang, San Diego, CA (US); Ragulan Sinnarajah, San Diego, CA (US); Brian K. Butler, La Jolla, CA (US); Edward G. Tiedemann, Jr., Concord, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/688,821

(22) Filed: Mar. 20, 2007

(65) Prior Publication Data

US 2007/0243871 A1    Oct. 18, 2007

Related U.S. Application Data

(63) Continuation of application No. 10/801,221, filed on Mar. 15, 2004, now Pat. No. 7,254,394, which is a continuation of application No. 09/933,607, filed on Aug. 20, 2001, now Pat. No. 6,731,936.

(51) Int. Cl.
*H04W 36/00* (2009.01)
(52) U.S. Cl. .................................. 455/437; 455/442
(58) Field of Classification Search .................. 455/437, 455/442, 436, 438, 439, 423, 435.2, 435.3, 455/518, 519, 522, 527, 67.16; 370/331, 370/332, 328
See application file for complete search history.

(56) References Cited

U.S. PATENT DOCUMENTS

| | | | |
|---|---|---|---|
| 4,424,565 A | 1/1984 | Larson | |
| 4,521,806 A | 6/1985 | Abraham | |
| 4,901,307 A | 2/1990 | Gilhousen et al. | |
| 5,091,905 A | 2/1992 | Amada | |
| 5,103,459 A | 4/1992 | Gilhousen et al. | |

(Continued)

FOREIGN PATENT DOCUMENTS

EP      1085660      3/2001

(Continued)

OTHER PUBLICATIONS

"Digital cellular telecommunications system (Phase 2+): (GSM) Universal Mobile Telecommunications System (UMTS): General Packet Radio Service (GRPS) Service description: Stage 2 (3GPP TS 23.060 Ver. 3.8.0 Rel. 1999)." ETSI TS 123 060 Ver. 3.8.0, Jun. 1, 2001, pp. 134-135.

(Continued)

*Primary Examiner* — Jean A Gelin
(74) *Attorney, Agent, or Firm* — Rupit M. Patel (57) ABSTRACT

A method and system for a handoff in a broadcast communication system is disclosed. A subscriber assisted handoff is impractical in a broadcast communication system due to e.g., a high signaling load, a difficulty to synchronize the broadcast transmission. On the other hand, the small number of broadcast channels enables the subscriber station to perform the handoff autonomously. To streamline the autonomous handoff decision process, several distinct sets of pilot identifiers and rules for transitioning among the sets are defined. To fully integrate broadcast services with the services provided by the cellular telephone systems in a subscriber environment, a method for various handoff scenarios are analyzed.

16 Claims, 5 Drawing Sheets

U.S. PATENT DOCUMENTS

| | | | |
|---|---|---|---|
| 5,267,261 A | 11/1993 | Blakeney, II et al. | |
| 5,504,773 A | 4/1996 | Padovani et al. | |
| 5,548,814 A | 8/1996 | Lorang et al. | |
| 5,594,718 A | 1/1997 | Weaver et al. | |
| 5,642,398 A | 6/1997 | Tiedemann, Jr. et al. | |
| 5,678,184 A * | 10/1997 | Cutler et al. | 455/436 |
| 5,812,540 A | 9/1998 | Bruckert et al. | |
| 5,844,620 A | 12/1998 | Coleman et al. | |
| 5,873,043 A | 2/1999 | Comer | |
| 5,909,651 A | 6/1999 | Chander et al. | |
| 5,933,787 A | 8/1999 | Gilhousen et al. | |
| 5,974,320 A | 10/1999 | Ward et al. | |
| 6,032,205 A | 2/2000 | Ogimoto et al. | |
| 6,049,323 A | 4/2000 | Rockwell et al. | |
| 6,055,428 A | 4/2000 | Soliman | |
| 6,122,514 A | 9/2000 | Spaur et al. | |
| 6,178,446 B1 | 1/2001 | Gerszberg et al. | |
| 6,233,455 B1 | 5/2001 | Ramakrishna et al. | |
| 6,272,117 B1 | 8/2001 | Choi et al. | |
| 6,337,983 B1 | 1/2002 | Bonta et al. | |
| 6,344,882 B1 | 2/2002 | Shim et al. | |
| 6,351,656 B1 | 2/2002 | Burgan et al. | |
| 6,393,282 B1 | 5/2002 | Iimori | |
| 6,400,946 B1 | 6/2002 | Vazvan | |
| 6,434,389 B1 * | 8/2002 | Meskanen et al. | 455/437 |
| 6,434,390 B2 | 8/2002 | Rahman | |
| 6,452,644 B1 | 9/2002 | Shimakawa et al. | |
| 6,462,671 B2 | 10/2002 | Bushner et al. | |
| 6,477,157 B1 | 11/2002 | Kim et al. | |
| 6,505,160 B1 | 1/2003 | Levy et al. | |
| 6,526,027 B1 | 2/2003 | Yeom | |
| 6,539,030 B1 | 3/2003 | Bender et al. | |
| 6,542,742 B2 | 4/2003 | Schramm et al. | |
| 6,556,131 B1 | 4/2003 | Besharat et al. | |
| 6,574,211 B2 | 6/2003 | Padovani et al. | |
| 6,584,087 B1 | 6/2003 | Czaja et al. | |
| 6,594,498 B1 | 7/2003 | McKenna et al. | |
| 6,651,141 B2 | 11/2003 | Adrangi | |
| 6,681,114 B2 | 1/2004 | Chang et al. | |
| 6,697,651 B2 | 2/2004 | Li | |
| 6,704,328 B1 | 3/2004 | Khaleghi et al. | |
| 6,731,936 B2 * | 5/2004 | Chen et al. | 455/437 |
| 6,747,962 B2 | 6/2004 | Lintulampi et al. | |
| 6,785,551 B1 | 8/2004 | Richard | |
| 6,829,486 B2 | 12/2004 | McKenna et al. | |
| 6,845,104 B2 | 1/2005 | Johnson et al. | |
| 6,892,073 B2 | 5/2005 | Fattouch | |
| 6,904,611 B1 | 6/2005 | Poli et al. | |
| 6,940,421 B2 | 9/2005 | Chamberlain et al. | |
| 6,961,316 B2 | 11/2005 | Yamaguchi et al. | |
| 6,980,820 B2 | 12/2005 | Sinnarajah et al. | |
| 6,985,779 B2 | 1/2006 | Hsiung et al. | |
| 6,993,000 B2 | 1/2006 | Famolari | |
| 7,035,383 B2 | 4/2006 | O'Neal | |
| 7,054,660 B2 | 5/2006 | Lord | |
| 7,061,880 B2 | 6/2006 | Basilier | |
| 7,142,860 B2 | 11/2006 | Mildh et al. | |
| 7,231,399 B1 | 6/2007 | Bem et al. | |
| 7,236,788 B2 | 6/2007 | Mohebbi | |
| 7,246,365 B2 | 7/2007 | Lee | |
| 7,277,407 B2 | 10/2007 | Kim et al. | |
| 7,293,094 B2 | 11/2007 | Vaman et al. | |
| 7,327,676 B2 | 2/2008 | Teruhi et al. | |
| 7,336,952 B2 | 2/2008 | Leung | |
| 7,346,374 B2 | 3/2008 | Witkowski et al. | |
| 7,359,715 B2 | 4/2008 | Choksi | |
| 7,411,901 B1 | 8/2008 | Alexander et al. | |
| 2001/0017851 A1 | 8/2001 | Yamaguchi et al. | |
| 2001/0040511 A1 | 11/2001 | Bushner et al. | |
| 2001/0048735 A1 | 12/2001 | O'neal | |
| 2002/0010789 A1 | 1/2002 | Lord | |
| 2002/0032024 A1 | 3/2002 | Namba et al. | |
| 2002/0046407 A1 | 4/2002 | Franco | |
| 2002/0067284 A1 | 6/2002 | Chamberlain et al. | |
| 2002/0087797 A1 | 7/2002 | Adrangi | |
| 2002/0169885 A1 | 11/2002 | Alao et al. | |
| 2002/0174439 A1 | 11/2002 | Akiyama et al. | |
| 2002/0193139 A1 | 12/2002 | Mildh et al. | |
| 2003/0054807 A1 | 3/2003 | Hsu et al. | |
| 2003/0072269 A1 | 4/2003 | Teruhi et al. | |
| 2003/0073441 A1 | 4/2003 | Fattouch | |
| 2003/0109951 A1 | 6/2003 | Hsiung et al. | |
| 2003/0134622 A1 | 7/2003 | Hsu et al. | |
| 2003/0157949 A1 | 8/2003 | Sarkkinen et al. | |
| 2003/0165155 A1 | 9/2003 | Johnson et al. | |
| 2004/0048622 A1 | 3/2004 | Witkowski et al. | |
| 2004/0125740 A1 | 7/2004 | Gardner | |
| 2004/0198371 A1 | 10/2004 | Balasubramanian et al. | |
| 2004/0203816 A1 | 10/2004 | Bae et al. | |
| 2005/0053023 A1 | 3/2005 | Rajkotia et al. | |
| 2005/0054331 A1 | 3/2005 | Balachandran et al. | |
| 2005/0063340 A1 | 3/2005 | Hoffmann et al. | |
| 2005/0075107 A1 | 4/2005 | Wang et al. | |
| 2007/0061845 A1 | 3/2007 | Barnes | |
| 2007/0099632 A1 | 5/2007 | Choksi | |

FOREIGN PATENT DOCUMENTS

| | | |
|---|---|---|
| EP | 1189469 | 3/2002 |
| JP | 11501783 | 2/1999 |
| JP | 11-069437 | 3/1999 |
| JP | 2000-224648 | 8/2000 |
| JP | 2000-312371 | 11/2000 |
| JP | 2001-069549 | 3/2001 |
| JP | 20020095045 | 3/2002 |
| KR | 199932845 | 12/1999 |
| KR | 20010053883 | 7/2001 |
| KR | 2003-48502 | 6/2003 |
| RU | 2155451 | 8/2000 |
| WO | 9610895 | 4/1996 |
| WO | WO9628947 | 9/1996 |
| WO | WO9833288 | 7/1998 |
| WO | 9952304 | 10/1999 |
| WO | 0027158 | 5/2000 |
| WO | 0110146 | 2/2001 |
| WO | WO0110146 A1 | 2/2001 |
| WO | WO0149061 | 7/2001 |
| WO | WO03037030 | 5/2003 |
| WO | WO03063418 A1 | 7/2003 |
| WO | WO03071725 A2 | 8/2003 |
| WO | 2004039002 | 5/2004 |

OTHER PUBLICATIONS

"Digital cellular telecommunications system (Phase 2+): Technical realization of Short Message Service Cell Broadcast (SMSCB) (GSM 03.41 Ver. 5.8.1)." European Telecommunication Standard. 4th Ed. No. ETS 300 902, Jun. 1998, pp. 1-30.

"Digital cellular telecommunications system (Phase 2+): Voice Broadcast Service (VBS): Stage 2 (GSM 03.69 Ver. 7.0.0 Rel. 1998)," ETSI TS 100 934, Ver. 7.0.0, Aug. 1, 1999, pp. 19-20.

ETSI TS 125 211 v4.1.0; "Universal Mobile Telecommunications System (UMTS): Physical channels and mapping of transport channels onto physical channels (FDD)". 3GPP TS 25.211 version 4.1.0 Release 4 (Jun. 2001).

ETSI TS 125 212 v.4.1.0; "Universal Mobile Telecommunications System (UMTS): Multiplexing and channel coding (FDD)", 3G TS 25.212 version 4.1.0 Release 4 (Jun. 2001).

ETSI TS 125 213 v4.1.0; "Universal Mobile Telecommunications System (UMTS): Spreading and modulation (FDD)", 3G TS 25.213 version 4.1.0 Release 4 (Jun. 2001).

ETSI TS 125 214 v4.1.0; "Universal Mobile Telecommunications System (UMTS): Physical layer procedures (FDD)", 3G TS 25.214 version 4.1.0 Release 4 (Jun. 2001).

3GPP2-C.S0002-C v3.0, "Physical Layer Standard for cdma2000 Spread Spectrum Systems", (TR 45.5), Jun. 2001.

TIA/EIA/IS-856, "cdma2000 High Rate Packet Data Air Interface Specification," version 2.0, Oct. 27, 2000.

TIA/EIA/IS-95, "Mobile Station-Base Station Compatibility Standard for Dual-Mode Wideband Spread Spectrum Cellular System", Jul. 1993.

3GPP TS 25.211 V6.1.0 (Jun. 2004): 3rd Generation Partnership Project; Technical Specification Group Radio Access Network; Physical channels and mapping of transport channels onto physical channels (FDD)(Release 6).

3GPP TS 25.212 V6.2.0 (Jun. 2004): 3rd Generation Partnership Project, Technical Specification Group Radio Access Network; Multiplexing and channel coding (FDD)(Release 6).

3GPP TS 25.213 v6.0.0 (Dec. 2003) 3rd Generation Partnership Project; Technical Specification Group Radio Access Network; Spreading and Modulation (FDD) (Release 6).

3GPP TS 25 214 v6.2.0 (Jun. 2004) 3rd Generation Partnership Project, Technical Specification Group Radio Access Network; Physical Layer Procedures (FDD) (Release 6).

Chen, U.S. Appl. No. 60/279,970, "Method and Apparatus for Group Calls Using Dedicated and Common channels in Wireless Networks," Mar. 28, 2001.

SWG2.3 BCMCS ADHOC: "Signaling Support for 1X BCMCS" 3GPP, Aug. 28, 2003, pp. 1-53, XP002315846.

TIA/EIA/IS-95 "Mobile Station-Base Station Compatibility Standard for Dual-Mode Wideband Spread Spectrum Cellular System" Jul. 1993.

TR 45.5 3GPP2 C.S0002-C Version 1.0; (May 28, 2002); Physical Layer Standard for cdma 2000; Spread Spectrum Systems (Release C).

* cited by examiner

METHOD AND SYSTEM FOR A HANDOFF IN A BROADCAST COMMUNICATION SYSTEM

CLAIM OF PRIORITY UNDER 35 U.S.C. §120

The present Application for Patent is a Continuation of patent application Ser. No. 10/801,221, entitled "Method and System for a Handoff in a Broadcast Communication System" filed Mar. 15, 2004, now U.S. Pat. No. 7,254,394, which is a Continuation of patent application Ser. No. 09/933,607 entitled "METHOD AND SYSTEM FOR A HANDOFF IN A BROADCAST COMMUNICATION SYSTEM" filed Aug. 20, 2001, now issued as U.S. Pat. No. 6,731,936, and all are assigned to the assignee hereof and hereby expressly incorporated by reference herein.

BACKGROUND

1. Field

The present invention relates to broadcast communications, otherwise known as point-to-multipoint, in a wireline or a wireless communication system. More particularly, the present invention relates to a system and method for a handoff in such a broadcast communication system.

2. Background

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of subscriber units requiring intermittent service of relatively short duration rather than continuous access to the common communication channel. Several multiple-access techniques are known in the art, such as time division multiple-access (TDMA), frequency division multiple-access (FDMA), and amplitude modulation multiple-access (AM). Another type of a multiple-access technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

An example of a data only communication system is a high data rate (HDR) communication system that conforms to the TIA/EIA/IS-856 industry standard, hereinafter referred to as the IS-856 standard. This HDR system is based on a communication system disclosed in application Ser. No. 08/963,386, entitled "METHOD AND APPARATUS FOR HIGH RATE PACKET DATA TRANSMISSION," filed Nov. 3, 1997, now U.S. Pat. No. 6,574,211, issued on Jun. 3, 2003, assigned to the assignee of the present invention. The HDR communication system defines a set of data rates, ranging from 38.4 kbps to 2.4 Mbps, at which an access point (AP) may send data to a subscriber station (access terminal, AT). Because the AP is analogous to a base station, the terminology with respect to cells and sectors is the same as with respect to voice systems.

In a multiple-access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. The forward link refers to transmission from a base station to a subscriber station and the reverse link refers to transmission from a subscriber station to a base station. Likewise, the communication can be conducted between a first user on one subscriber station and a second user on a landline station. A base station receives the data from the user on a reverse link, and routes the data through a public switched telephone network (PSTN) to the second user. In many communication systems, e.g., IS-95, W-CDMA, IS-2000, the forward link and the reverse link are allocated separate frequencies.

When a subscriber station travels outside the boundary of the base station with which the subscriber station currently communicates, it is desirable to maintain the communication link by transferring the call to a different subscriber station. The method and system for providing a communication with a subscriber station through more than one base station during the soft handoff process are disclosed in U.S. Pat. No. 5,267,261, entitled "MOBILE ASSISTED SOFT HANDOFF IN A CDMA CELLULAR TELEPHONE SYSTEM," assigned to the assignee of the present invention. The method and system for providing a softer handoff is described in detail in U.S. Pat. No. 5,933,787, entitled "METHOD AND APPARATUS FOR PERFORMING HANDOFF BETWEEN SECTORS OF A COMMON BASE STATION," assigned to the assignee of the present invention. Using these methods, communication between the subscriber stations is uninterrupted by the eventual handoff from an original base station to a subsequent base station. This type of handoff may be considered a "soft" handoff in that communication with the subsequent base station is established before communication with the original base station is terminated. When the subscriber unit is in communication with two base stations, the subscriber unit combines the signals received from each base station in the same manner that multipath signals from a common base station are combined.

In accordance with the above-cited inventions, each base station transmits a pilot signal of a common PN spreading code offset in code phase from pilot signals of other base stations. A subscriber station assisted soft handoff operates based on the pilot signal strength detected by the subscriber station. To streamline the process of searching for pilots, four distinct sets of pilot offsets are defined: the Active Set, the Candidate Set, the Neighbor Set, and the Remaining Set. The Active Set identifies the base station(s) or sector(s) through which the subscriber station is communicating. The Candidate Set identifies the base station(s) or sector(s) for which the pilots have been received at the subscriber station with sufficient signal strength to make them members of the Active Set, but have not been placed in the Active Set by the base station(s). The Neighbor Set identifies the base station(s) or sector(s), which are likely candidates for the establishment of communication with the subscriber station. The Remaining Set identifies the base station(s) or sector(s) having all other possible pilot offsets in the current system, excluding those pilot offsets currently in the Active, the Candidate and Neighbor sets.

The subscriber station is provided with a list of PN offsets corresponding to base stations of neighboring cells. In addition, the subscriber station is provided with a message which identifies at least one pilot corresponding to a base station to which the subscriber station is to communicate through. These lists are stored at the subscriber station as a Neighbor Set and an Active Set of pilots, and are updated as conditions change.

When communication is initially established, a subscriber unit communicates through a first base station and the Active Set contains only a pilot signal of the first base station. The subscriber unit monitors pilot signal strength of the base stations of the Active Set, the Candidate Set, the Neighbor Set, and the Remaining Set. When a pilot signal of a base station in the Neighbor Set or Remaining Set exceeds a predetermined threshold level (T_ADD), the pilot signal identifier is added to the Candidate Set. The subscriber unit communicates a Power Strength Measurement Message (PSMM) to the first base station identifying the new base station. A system controller decides whether to establish communication between the new base station and the subscriber unit, and communicates the decision in a Handoff Direction Message (HDM). The message identifies the pilots of the Active Set which correspond to base stations through which the subscriber station is to communicate. The system controller also communicates information to each base station corresponding to a new pilot in the Active Set which instructs each of these base stations to establish communications with the subscriber station. The subscriber station communications are thus routed through all base stations identified by pilots in the subscriber station Active Set.

When the subscriber unit is communicating through multiple base stations, it continues to monitor the signal strength of the base stations of the Active Set, the Candidate Set, the Neighbor Set, and the Remaining Set. Should the signal strength corresponding to a base station of the Active Set drop below a predetermined threshold (T_DROP) for a predetermined period of time (T_TDROP), the subscriber unit generates and transmits a message to report the event. The system controller receives this message through at least one of the base stations with which the subscriber unit is communicating. The system controller may then decide to terminate communications through the base station whose pilot signal strength as measured at the subscriber station is below the T_DROP.

The system controller upon deciding to terminate communications through a base station generates a new message identifying the pilots of the Active Set to which the subscriber station is to communicate through. In this message, which identifies pilots of the Active Set, the pilot of the base station to which communications with the subscriber station are to be terminated is not identified. The system controller also communicates information to the base station not identified in the Active Set to terminate communications with the subscriber station. The subscriber station, upon receiving the message identifying pilots of the Active Set, discontinues processing signals from the base station whose pilot is no longer in the Active Set. The subscriber station communications are thus routed only through base stations identified by pilots in the subscriber station Active Set. In the case where there were previously more than one pilot identified in the Active Set and now only one, the subscriber station communicates only to the one base station corresponding to the pilot identified in the subscriber station Active Set.

The above-described wireless communication service is an example of a point-to-point communication service. In contrast, broadcast services provide central station-to-multipoint communication service. The basic model of a broadcast system consists of a broadcast net of users served by one or more central stations, which transmit information with a certain contents, e.g., news, movies, sports events and the like to the users. Each broadcast net user's subscriber station monitors a common broadcast forward link signal. Because the central station fixedly determines the content, the users are generally not communicating back. Examples of common usage of broadcast services communication systems are TV broadcast, radio broadcast, and the like. Such communication systems are generally highly specialized purpose-build communication systems. With the recent, advancements in wireless cellular telephone systems there has been an interest of utilizing the existing infrastructure of the mainly point-to-point cellular telephone systems for broadcast services. (As used herein, the term "cellular" systems encompasses communication system utilizing both cellular and PCS frequencies.)

Although the described handoff method for subscriber units acting as point-to-point units described above could be applied to broadcast systems, because in a broadcast system, large number of subscribers monitor a common broadcast forward channel, a handoff based on base station-subscriber station signaling message exchange would result in a high signaling load. Furthermore, as described in the above-cited U.S. Pat. Nos. 5,267,261, and 5,933,787, the transmissions received simultaneously by a subscriber station during handoff are synchronized at the transmitting base stations. Because broadcast transmission is intended for many subscriber stations, the base station cannot synchronize transmission for each subscriber station desiring to handoff. Based on the foregoing, there is a need in the art for a system and method for handoff in such a broadcast communication system.

SUMMARY

Embodiments disclosed herein address the above-stated needs by providing a method for autonomous handoff in a broadcast communication system, by receiving at a subscriber station a broadcast channel transmitted through a first sector, measuring at the subscriber station a quality metric of a forward link transmitted by sectors, identifying at the subscriber station at least one sector, different from the first sector, for which said measured quality metric exceeds a first pre-determined threshold; and combining at the subscriber station broadcast channels received from the first sector and said at least one identified sector.

In another aspect, the above-stated needs are addressed by providing method for a set management in a broadcast communication system, comprising providing to a subscriber station a first list identifying a first set of sectors; measuring at the subscriber station a quality metric of a forward link transmitted by each identified sector; removing from said first list at the subscriber station an identifier of a sector said measured quality metric of which exceeds a first predetermined level; and placing the identifier of the sector into a second list at the subscriber station.

In another aspect, the above-stated needs are addressed by providing method for method for transitioning a subscriber station from an area covered by a first sector into an area covered by a different sector in a broadcast communication system, comprising determining at the subscriber station a configuration of a broadcast channel transmitted by a second sector; and transitioning from the coverage area covered by the first sector in accordance with said determined configuration of the broadcast channel transmitted by the second sector.

DETAILED DESCRIPTION

Definitions

The word "exemplary" is used herein to mean "serving as an example, instance, or illustration." Any embodiment described herein as "exemplary" is not necessarily to be construed as preferred or advantageous over other embodiments.

The terms point-to-point communication is used herein to mean a communication between two subscriber stations over a dedicated communication channel.

The terms group service, point-to-multipoint communication, push-to-talk, or dispatch service are used herein to mean a communication wherein a plurality of subscriber stations are receiving communication from, typically, one subscriber station.

The term packet is used herein to mean a group of bits, including data (payload) and control elements, arranged into a specific format. The control elements comprise, e.g., a preamble, a quality metric, and others known to one skilled in the art. Quality metric comprises, e.g., a cyclical redundancy check (CRC), a parity bit, and others known to one skilled in the art.

The term access network is used herein to mean a collection of base stations (BS) and one or more base stations' controllers. The access network transports data packets between multiple subscriber stations. The access network may be further connected to additional networks outside the access network, such as a corporate intranet or the Internet, and may transport data packets between each access terminal and such outside networks.

The term base station is used herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station is used herein to mean the hardware with which an access network communicates. A subscriber station may be mobile or stationary. A subscriber station may be any data device that communicates through a wireless channel or through a wired channel, for example using fiber optic or coaxial cables. A subscriber station may further be any of a number of types of devices including but not limited to PC card, compact flash, external or internal modem, or wireless or wireline phone. A subscriber station that is in the process of establishing an active traffic channel connection with a base station is said to be in a connection setup state. A subscriber station that has established an active traffic channel connection with a base station is called an active subscriber station, and is said to be in a traffic state.

The term physical channel is used herein to mean a communication route over which a signal propagates described in terms of modulation characteristics and coding.

The term logical channel is used herein to mean a communication route within the protocol layers of either the base station or the subscriber station.

The term communication channel/link is used herein to mean a physical channel or a logical channel in accordance with the context.

The term reverse channel/link is used herein to mean a communication channel/link through which the subscriber station sends signals to the base station.

A forward channel/link is used herein to mean a communication channel/link through which a base station sends signals to a subscriber station.

The term soft handoff is used herein to mean a communication between a subscriber station and two or more sectors, wherein each sector belongs to a different cell. The reverse link communication is received by both sectors, and the forward link communication is simultaneously carried on the two or more sectors' forward links.

The term softer handoff is used herein to mean a communication between a subscriber station and two or more sectors, wherein each sector belongs to the same cell. The reverse link communication is received by both sectors, and the forward link communication is simultaneously carried on one of the two or more sectors' forward links.

The term erasure is used herein to mean failure to recognize a message.

The term dedicated channel is used herein to mean a channel modulated by information specific to an individual subscriber station.

The term common channel is used herein to mean a channel modulated by information shared among all subscriber stations.

Description

Figure 1:
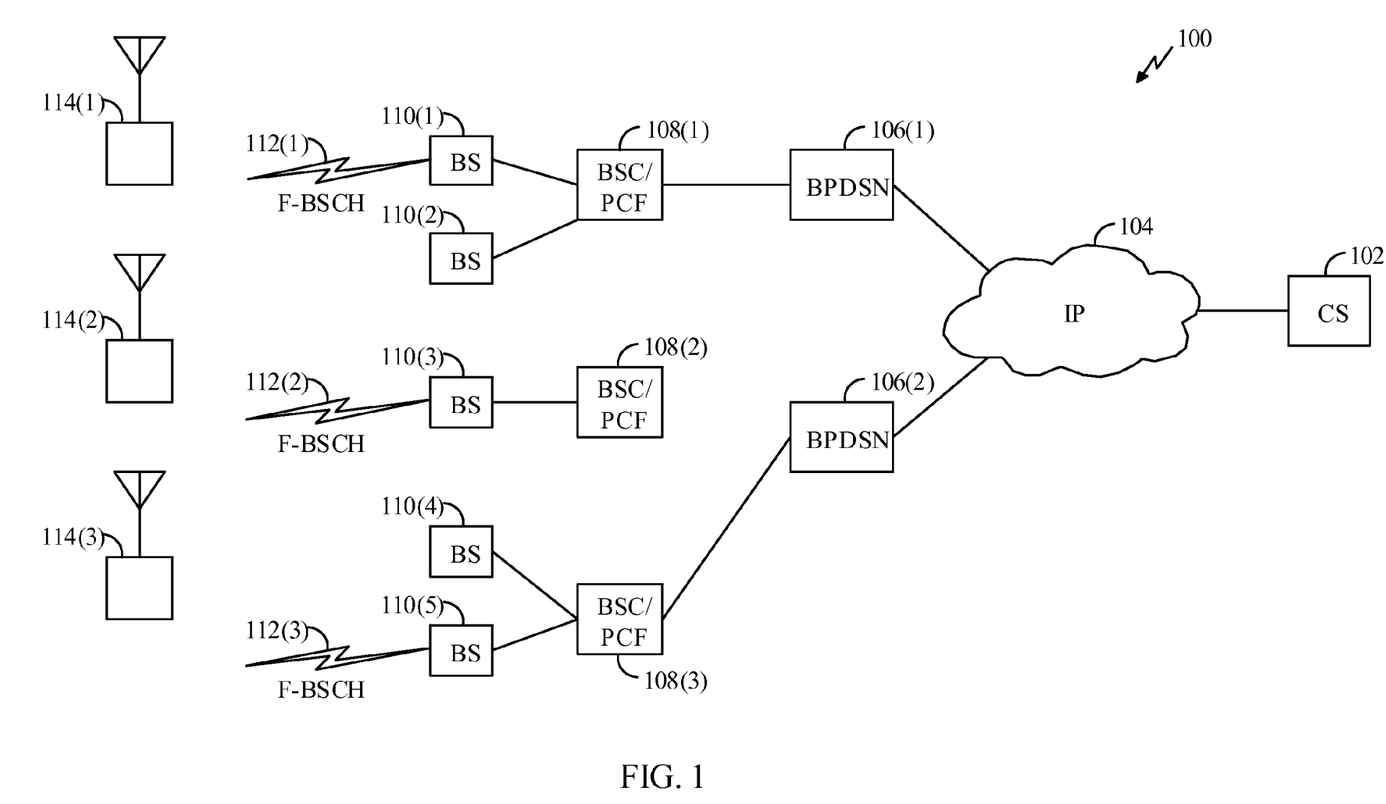
FIG. 1 illustrates conceptual block diagram of a High-Speed Broadcast Service communication system.

As discussed a basic model of a broadcast system comprises a broadcast net of users, served by one or more central stations, which transmit information with a certain contents, e.g., news, movies, sports events and the like to the users. Each broadcast net user's subscriber station monitors a common broadcast forward link signal. FIG. 1 illustrates conceptual block diagram of a communication system 100, capable of performing High-Speed Broadcast Service (HSBS) in accordance with embodiments of the present invention.

The broadcast content originates at a content server (CS) 102. The content server may be located within the carrier network (not shown) or outside Internet (IP) 104. The content is delivered in a form of packets to a broadcast packet data-serving node (BPDSN) 106. The term BPSDN is used because although the BPDSN may be physically co-located or be identical to the regular PDSN (not shown), the BPSDN may be logically different from a regular PDSN. The BPDSN 106 delivers the packets according to the packet's destination to a packet control function (PCF) 108. The PCF is a control entity controlling function of base stations 110 for the HSBS and any general packet data services, as a base station controller is for regular voice services. To illustrate the connection of the high level concept of the HSBS with the physical access network, FIG. 1 shows that the PCF is physically co-located or even identical, but logically different from a base station controller (BSC). One of ordinary skills in the art understands that this is for a pedagogical purposes only. The BSC/PCF 108 provides the packets to base stations 110. The communication system 100 enables the HSBS by introducing a forward broadcast shared channel 112 (F-BSCH) transmitted by base stations 110. The F-BSCH 112 need not be transmitted from every base station 110. A F-SBCH is capable of high data rates that can be received by a large number of subscriber stations. The term forward broadcast shared channel is used.

The F-BSCH may be monitored by a large number of subscribers 114. Consequently, the base station-subscriber station signaling message based handoff is not efficient in a HSBS because such a handoff results in a high signaling load and may not be feasible since it is a fixed broadcast transmission not tailored for a particular subscriber station. On the other hand, because of the high power demand for transmission of the common broadcast forward channel, there are only few common broadcast forward channel on a given CDMA carrier, which makes autonomous soft and softer handoff without the base station-subscriber station signaling message exchange practical.

Figure 2:
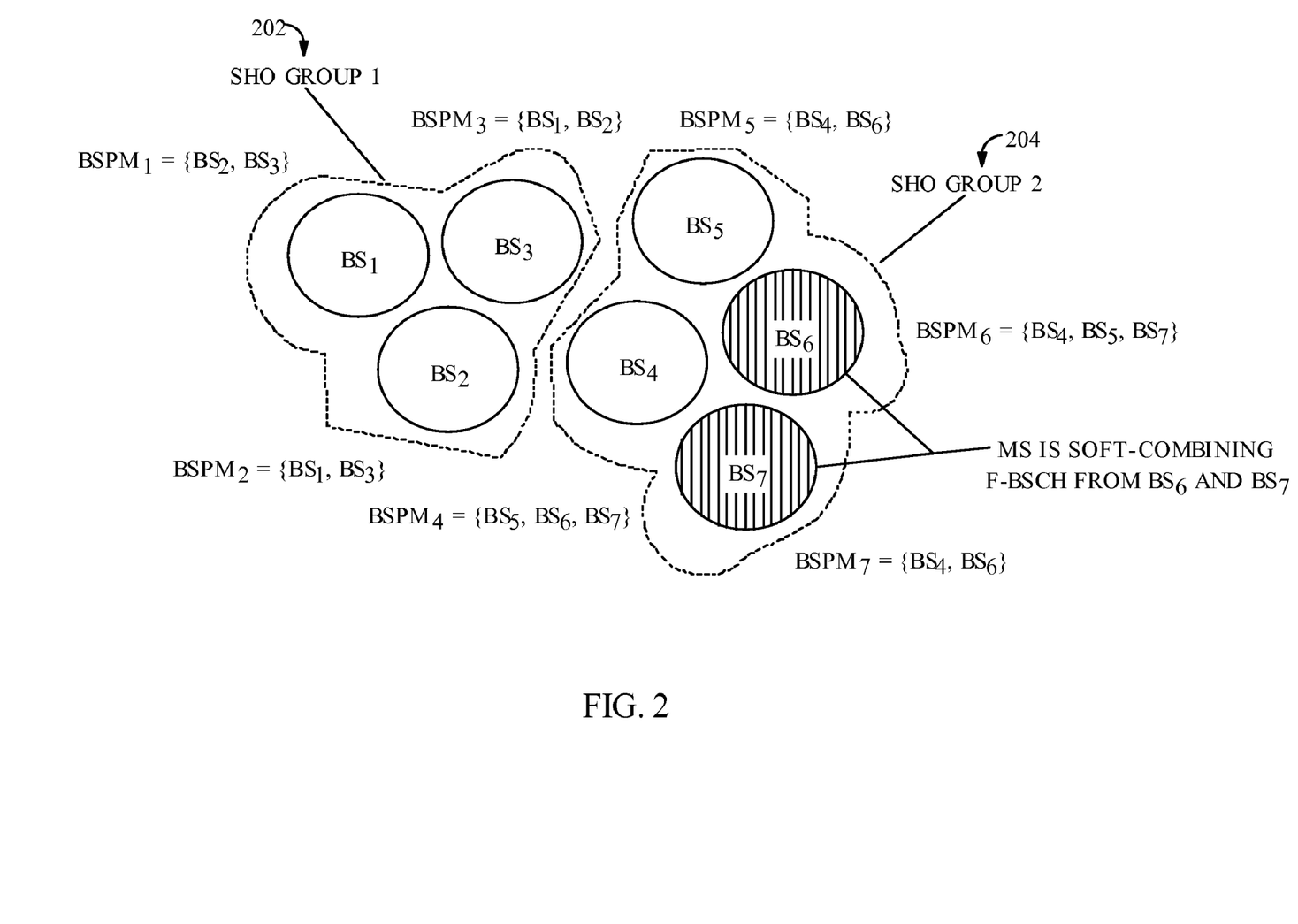
FIG. 2 illustrates concept of soft-handoff groups in a broadcast communication system.

Therefore, instead of exchanging messages between a base station and a subscriber station desiring to handoff, the information regarding broadcast transmission in neighbor base stations is announced by overhead messages on each channel F-BSCH in each base station. Because a subscriber may soft combine the only synchronous transmissions, a Broadcast Service Parameters Message transmitted in each base station will list the identities of base stations that are part of this sector's soft handoff (SHO) group for each supported F-BSCH. The method and system for signaling, including both mentioned embodiments is described in detail in U.S. patent application Ser. No. 09/933,914, entitled "METHOD AND APPARATUS FOR BROADCAST SIGNALING IN A WIRELESS COMMUNICATION SYSTEM," filed Aug. 20, 2001, assigned to the assignee of the present invention. As used herein a SHO group means a group of all base station transmitting the Common Broadcast Forward Link synchronously. FIG. 2 illustrates two SHO groups, SHO Group 1 202 comprising $BS_1$, $BS_2$, and $BS_3$, and SHO Group 2 202 comprising $BS_4$, $BS_5$, $BS_6$, and $BS_7$.

Referring to FIG. 2, if a subscriber station crosses boundaries from a coverage area of SHO Group 1 202 to a coverage area of SHO Group 2 202, a hard handoff is required. The term hard handoff as used here means that monitoring of a first channel is discontinued before monitoring of the second channel begins ("break before make"). On the other hand, if a subscriber station monitors transmissions from a $BS_7$ and enters a coverage area of a new base station, e.g., $BS_6$, because both base stations are in the same SHO group the subscriber can monitor the F-BSCH transmission from the base stations before stop listening to the F-BSCH transmission from the $BS_7$.

Autonomous Soft Handoff

In one embodiment of the current invention, a subscriber station uses a quality metric of a forward link for decision, which F-BSCH to monitor. The quality metric may comprise, e.g., pilot signal strength, bit-error-rate, packet-error-rate, and other quality metrics known to one of ordinary skills in the art. To streamline the decision process, several distinct sets of pilot offsets and rules from transitioning among the sets are defined as discussed in detail below. For the ease of explanation of essential concepts of the various embodiments, the following discussion uses all sets, i.e., Active Set, the Candidate Set, and the Neighbor Set, and the Remaining Set. When the subscriber stations subscribed to HSBS services acquires a sector, it decodes a message, which provides the subscriber station with a list of identities of sectors that are part of the sector's SHO group for each supported F-BSCH. In accordance with one embodiment, the list is provided in a Broadcast Service Parameters Message transmitted in each sector. In accordance with another embodiment, the list is provided in existing overhead messages. The subscriber station initially assigns identifiers of sectors in the provided list into a Neighbor Set. The subscriber station monitors the signal strength of the sectors in the Neighbor Set, and assigns identifiers of the pilot signal into the Active Set, the Candidate Set, the Neighbor Set, in accordance with the monitored signal strength. As the subscriber station moves around, the subscriber station may update the overhead parameters of the $BS_6$ simultaneously. The Broadcast Service Parameters Message from the new sector may indicate additional members and delete some members of the SHO groups relative to the information in the old sector Broadcast Service Parameters Message. Therefore, while the Broadcast Service Parameters Message from the $BS_6$ ($BSPM_6$) contained members {$BS_4$, $BS_5$, $BS_7$}, the Broadcast Service Parameters Message from the $BS_7$ ($BSPM_7$) contains only members {$BS_4$, $BS_6$}. The subscriber station thus places certain sectors to a Remaining Set.

The advantage of a soft handoff is that a subscriber station may combine synchronous transmission of multiple sectors, subject to subscriber station capabilities, e.g., number of receiver fingers, processing power, and other known to one of ordinary skills in the art. Consequently, when the subscriber station decides to monitor an HSBS channel modulating a F-BSCH, assuming that the Active Set contains more than one pilot signal identifiers, the subscriber station may select to combine the F-BSCH from the sectors, the pilot signal identifiers of which belong to the Active Set, and have the highest signal strength. The subscriber station then tunes to the frequency transmitted by the sectors, modulated by the selected F-BSCH that is modulated by the HSBS channel. The subscriber station continues monitoring pilot signal strength of the sectors in the Active Set, the Candidate Set, the Neighbor Set, and the Remaining Set. When a pilot signal of a second sector in the Neighbor Set or Remaining Set qualifies for transition to the Active Set, the subscriber station adds the pilot signal's identifier to the Active Set. Thus, the subscriber station monitors the F-BSCH transmitted by only the sectors identified by pilots in the subscriber station Active Set.

While the subscriber station is monitoring the F-BSCH transmitted by multiple sectors, the subscriber station continues to measure the signal strength of the sectors of the Active Set, the Candidate Set, the Neighbor Set, and the Remaining Set. Should the signal strength of a pilot signal corresponding to a sector of the Active Set disqualify the pilot signal from being a member of the Active Set, the subscriber station may decide to remove the pilot signal identifier from the Active Set. If the subscriber station monitors the F-BSCH transmitted through the sector, the subscriber station then terminates monitoring the F-BSCH transmitted. In the case where there were previously more than one pilot identified in the Active Set and now only one, the subscriber station monitors only the one sector corresponding to the pilot signal, and identifier of which belongs to the Active Set.

Pilot Set Management

As discussed above, as the subscriber station assisted soft and softer handoff as described in the above-referenced U.S. Pat. Nos. 5,267,261, and 5,933,787, the autonomous soft handoff of the present invention utilizes a concept of pilot sets. In accordance with the above-referenced U.S. Pat. Nos. 5,267,261, and 5,933,787, the sector-subscriber station signaling assisted with pilot Set management. However, the autonomous soft handoff in accordance with embodiments of the invention does not utilize such a signaling, therefore, a different method of set management is needed. To better understand concepts of set management, the set management in accordance with the above-referenced U.S. Pat. Nos. 5,267,261, and 5,933,787 is reviewed, and then embodiments in accordance with the present invention are described.

Figure 3:
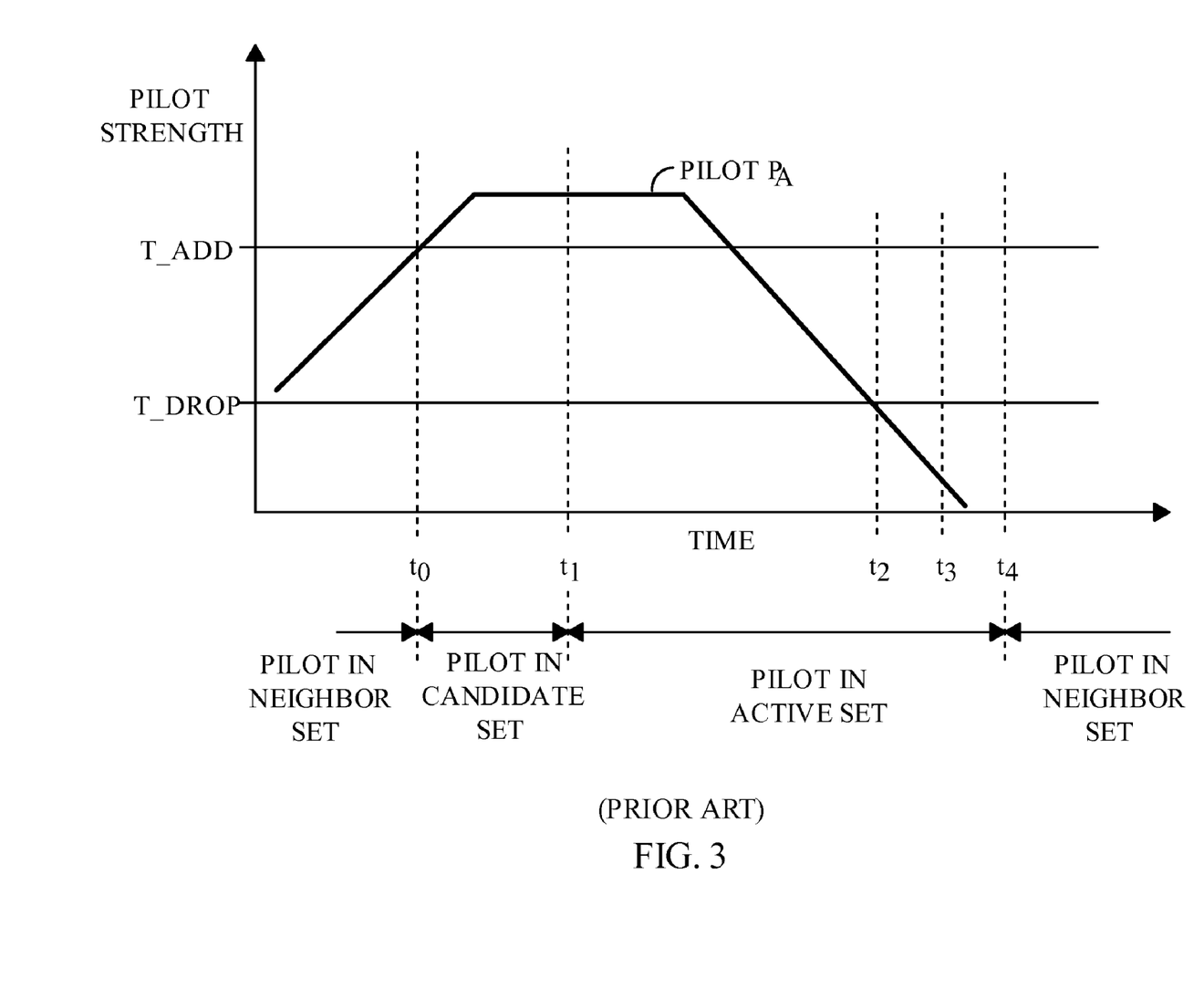
FIG. 3 illustrates an embodiment of signaling pertaining to the changes in a pilot's strength and the pilot's membership in the various sets for subscriber assisted handoff.

FIG. 3 illustrates an embodiment of the signaling pertaining to the changes in a pilot's strength and the pilot's membership in the various sets during a subscriber assisted handoff. In FIG. 3, before time $t_0$, the pilot $P_A$ is in the Neighbor Set with a rising signal strength as measured by the subscriber station's searcher receiver. However, the pilot signal strength is below the threshold T_ADD, which would qualify the pilot to enter the Candidate Set. The subscriber station control processor makes a decision to place a non-Active or non-Candidate Set member in the Candidate Set when the measured pilot exceeds the threshold value T_ADD, an event to which the subscriber station control processor generates and transmits a PSMM.

At time $t_0$ the pilot $P_A$ signal strength as measured by the searcher receiver exceeds the value T_ADD. The subscriber station control processor compares the measured value with the T_ADD value and determines that the T_ADD value has been exceeded. The subscriber station control processor thus generates and transmits a corresponding PSMM.

It should be noted that the searcher may detect several multipath versions of pilot $P_A$, which may be time-shifted from one another by several chips. The sum of all detected usable multipath versions of the pilot may be used for identifying the strength of the pilot.

The decision for placing a Candidate Set member into the Active Set is made by the system controller. For example, when the measured Candidate pilot is of a signal strength which exceeds the signal strength of one other Active Set member pilot by a predetermined value it may join the Active Set. However there may be limits placed on the number of Active Set members. Should the addition of a pilot to the Active Set exceed the Active Set limit, the weakest Active Set pilot may be removed to another set.

Once a decision is made by the system controller that a pilot should enter the Active Set, a Handoff Direction Message is sent to the subscriber station, all sectors that have a traffic channel assigned to the subscriber station, which includes the pilot $P_A$ in the Active Set. In FIG. 3 at time $t_1$ the Handoff Direction Message is received at the subscriber station where the identified pilots, including pilot $P_A$, are used to demodulate received signals from the sector from which pilot $P_A$ was transmitted and/or from another sector. Once a pilot is identified in the Handoff Direction Message, one version or multipath versions of the information signals if present corresponding to the identified pilot from the same sector may be demodulated. The signals ultimately demodulated may therefore be transmitted from one or more sector and may be multipath versions thereof. During the soft handoff the subscriber station diversity combines at the received signals at the symbol level. Therefore, all sectors participating in the soft handoff must transmit identical symbols, except for closed loop power control subchannel data as discussed later herein.

In FIG. 3 between the times $t_1$ and $t_2$ the pilot $P_A$ falls in signal strength to where at time $t_2$ the signal strength drops below a predetermined threshold value T_DROP. When the signal strength of a pilot drops the value T_DROP for a predetermined period of time, the subscriber station control processor again generates and transmits, at time $t_3$, a PSMM.

In response to this PSMM, the system controller generates a Handoff Direction Message that is sent to the subscriber station, by all sectors having a traffic channel assigned to the subscriber station, which no longer includes the pilot $P_A$ in the Active Set. At time $t_4$ the Handoff Direction Message is received at the subscriber station for removing the pilot $P_A$ from the Active Set, for example to the Neighbor Set. Once removed from the Active Set this pilot is no longer used for signal demodulation.

As well known to one of ordinary skills in the art, a spread spectrum communication system is interference limited. In subscriber station assisted handoff, the Candidate Set serves the purpose of keeping the pilot signal identifier in a convenient place for quick access, and the search frequency for the pilot signals in the Candidate Set is higher than the search frequency for the pilot signals in the Neighbor Set. Therefore, the effect of a delay between the PSMM and the HDM was minimized because upon receiving the HDM, the subscriber could quickly place the pilot signal into Active Set and start traffic channel combining, which improved signal-to-interference-and-noise-ratio (SINR). However, in autonomous handoff, the subscriber can change the search frequency and start traffic channel combining without the delay. Consequently, in one embodiment of the present invention, the Candidate Set is eliminated from the four distinct sets of pilot offsets. Thus, if a pilot strength exceeds a first threshold $T\_ADD_1$ at time $t_0$, the pilot is promoted from the Neighbor Set directly to the Active Set. One of ordinary skills in the art recognizes methods of promoting a pilot from a Neighbor Set are equally applicable for promoting a member form the Remaining set.

Figure 4:
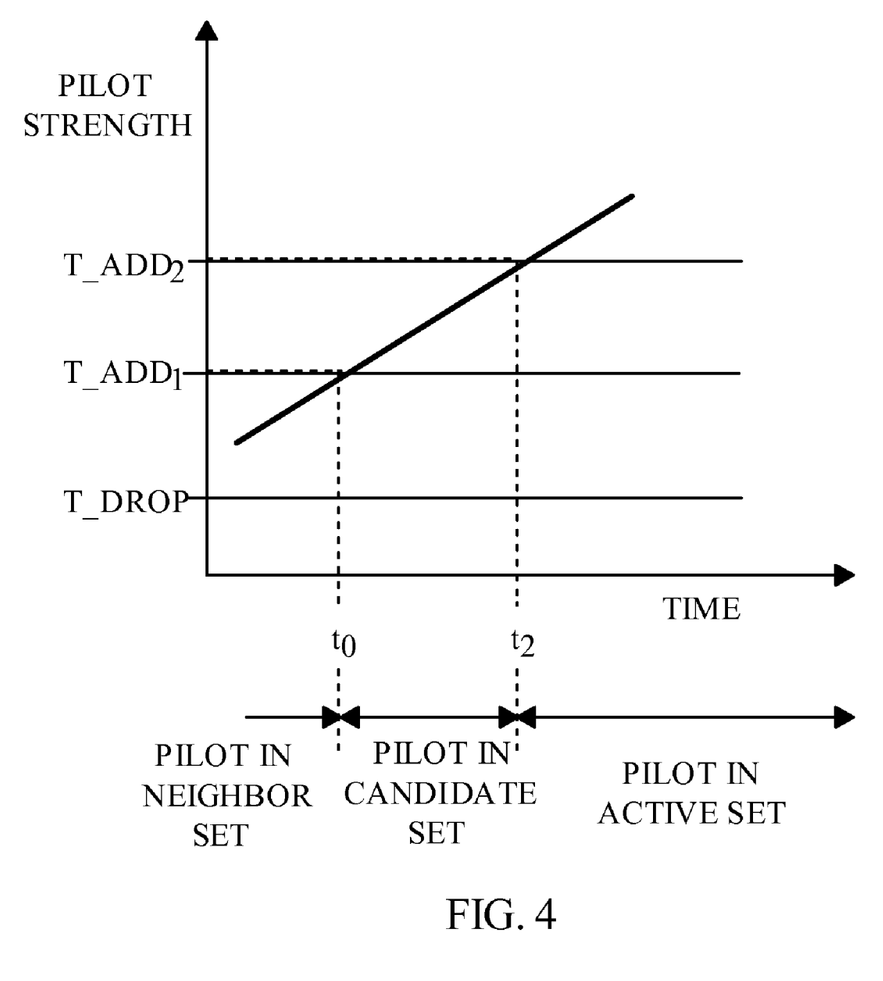
FIG. 4 illustrates an embodiment of signaling pertaining to the changes in a pilot's strength and the pilot's membership in the various sets in autonomous handoff.

In accordance with another embodiment of the present invention, the Candidate Set is retained. Referring to FIG. 4, the transition from a Neighbor Set to a Candidate Set occurs at time $t_0$, when a pilot strength exceeds a first threshold $T\_ADD_1$. The pilot signal is then observed, and in accordance with one embodiment promoted from the Candidate Set to the Active Set when the pilot strength exceeds a second threshold $T\_ADD_2$ at time $t_2$. In accordance with another embodiment, a timer for the pilot is started at time $t_0$. If the pilot remains in the Candidate Set for the timer interval (T_TADD), the pilot is promoted to the Active Set. If the pilot is removed from the Candidate Set before the T_TADD, the timer is stopped. Thus, the pilot signal is promoted only if the pilot signal strength increases or is stable.

Figure 5:
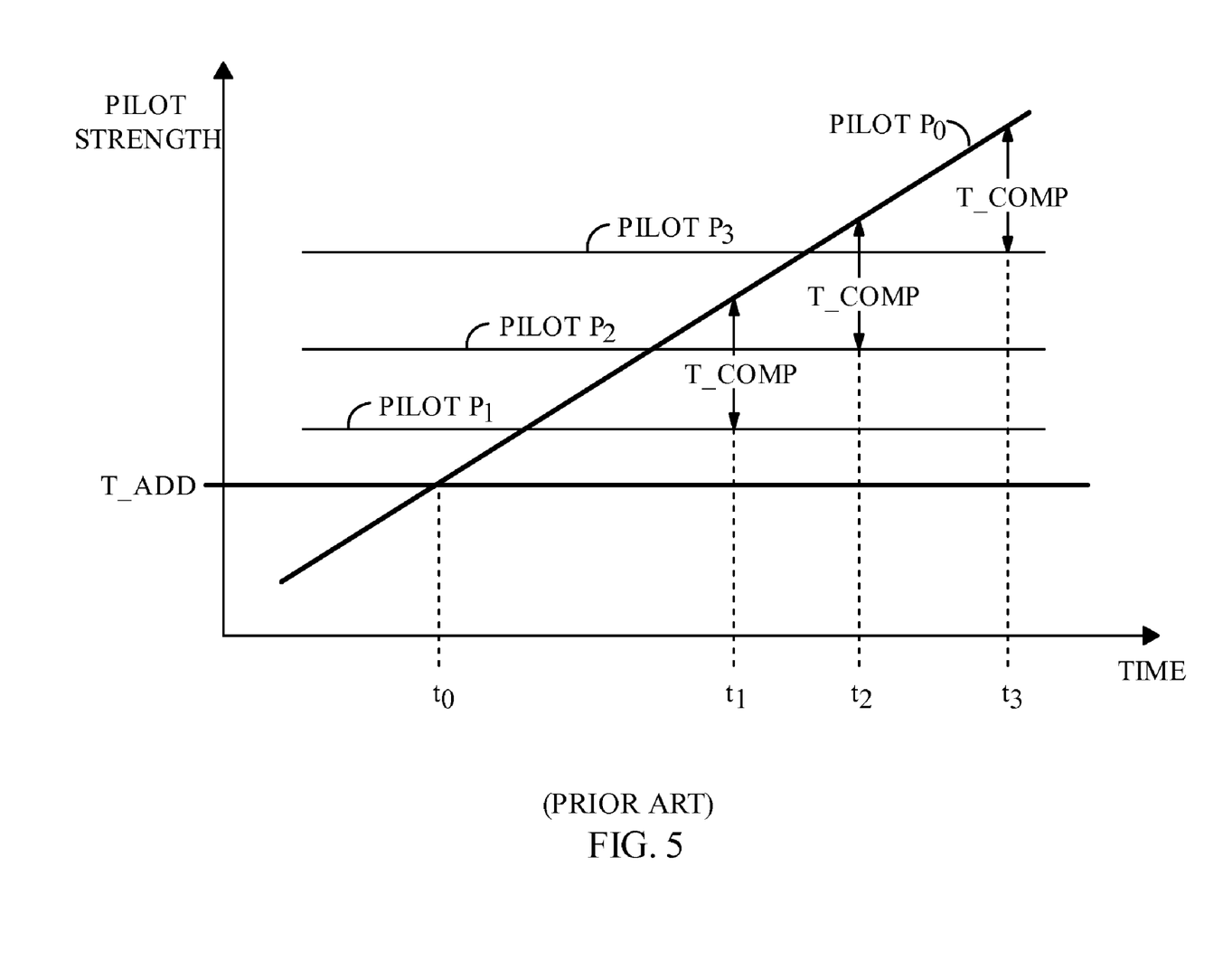
FIG. 5 illustrates an alternative mode, in which a pilot may be added to the Active Set for subscriber assisted handoff.

An alternative mode, in which a pilot may be added to the Active Set, is illustrated in reference to FIG. 5. Referring to FIG. 5, the strength of a pilot signal rises above members of the Active Set. When the signal strength of a pilot signal exceeds pilot signal strength of a pilot of an Active Set by at least T_COMP dB, the subscriber reports that event to the sector. In FIG. 5, pilots $P_1$, $P_2$ and $P_3$ are members of the Active Set while pilot $P_3$ is initially a member of another set such as the Neighbor Set.

Generally the number of Active Set members correspond to the number of data receivers available, however the Active Set may be of a greater number of pilots. The subscriber station is therefore permitted to select from the Active Set member pilots those of greatest signal strength for demodulation of the corresponding data signals. One of ordinary skills in the art understands that one or more pilots of the Active sets may have multipath propagations of the same sector or sector transmitted pilot as received at the subscriber station. In the case of multipath propagations, the subscriber station again selects signals for demodulation corresponding to those multipath versions of the pilots identified in the Active Set pilots of greatest signal strength. Therefore the actual sector signals demodulated by the subscriber station may be from different sectors or from a same sector.

At time $t_0$ the pilot $P_0$ as measured by the searcher receiver and compared with the value T_ADD by the subscriber station control processor is determined to be greater than the value T_ADD. As discussed above, this event results in the subscriber station control processor generating a PSMM, which is transmitted by the subscriber station to a sector for relay to the system control processor. The subscriber station also adds the pilot $P_0$ to the Candidate Set.

At time $t_1$ the pilot $P_0$ exceeds pilot $P_1$ by a value greater than the value T_COMP. The subscriber station control processor generates another PSMM, which is transmitted by the subscriber station to a sector for relay to the system control processor. It should be noted that only pilots that are already members of the Candidate Set are compared to Active Set members using the T_COMP criteria. Since the pilot $P_0$ has exceed the pilot $P_1$ by the value T_COMP, the system controller may begin setting up a modem at another sector or sector for communicating with the subscriber station. However if the pilot is not of another sector or sector, no setup is necessary. In either case the system controller would then communicate a Handoff Direction Message to the subscriber station including the pilot if not already an Active Set member.

The procedure is similar as pilot $P_0$ grows stronger. At time $t_2$ the pilot $P_0$ has grown stronger than the next strongest pilot $P_2$ by a value greater than the value T_COMP. Consequently, the subscriber station control processor generates another PSMM, which is transmitted by the subscriber station to a sector for relay to the system control processor. Since the pilot $P_0$ has exceed the pilot $P_2$ by the value T_COMP, the system controller may add the pilot to the Active Set as discussed above if not yet already done.

In subscriber assisted handoff, the addition of strong pilot to the Active Set via the T_COMP method served the purpose to quickly add a pilot with a fact increasing signal strength to the Active Set. As discussed, a base station controller had discretion to promote a pilot from a Candidate Set to the Active Set. If the sector decided not to promote the pilot to the Active Set, and the pilot signal strength kept rising, the sector transmitting the pilot signal became an interferer. To prompt the base station controller to act, the new PSMM in accordance with the T_COMP method was generated. However, in autonomous handoff, when the subscriber station identifies a pilot with a fast increasing signal strength, the subscriber station can change the search frequency and start channel combining immediately. Consequently, in accordance with one embodiment of the present invention, the T_COMP method of adding pilot identifiers to an Active Set is not utilized.

The size of the Active Set is limited. Therefore, a subscriber station may refuse to add an identifier of a pilot signal with sufficient signal strength into an Active Set when the Active Set is already full. If the pilot signal strength keeps rising, a sector transmitting the pilot signal became an interferer, and it may be advantageous to remove an identifier of a weaker pilot signal from the Active Set, add the identifier of the fast raising pilot, and start combining a signal from the sector. Therefore, in accordance with another embodiment of the present invention, the alternative mode of adding a pilot to the Active Set is retained. The method must be modified in accordance with the above-described embodiments of the present invention.

Consequently, in accordance with the embodiment, in which the Candidate Set is eliminated, the subscriber station monitors whether a signal strength of a pilot, an identifier of which is not a member of an Active Set, exceeds a pilot strength of a pilot an identifier of which is a member of the Active Set by a value of $T\_COMP_a$. Upon identifying such a pilot, the subscriber station makes a decision whether to add an identifier of the pilot to the Active Set.

In accordance with the embodiment, in which the Candidate Set is retained, if the transition method to a Candidate Set utilizes the two thresholds $T\_ADD_1$, and $T\_ADD_2$, the identifier of a pilot will be added to the Candidate Set when the pilot signal strength exceeds $T\_ADD_2$ as discussed. The subscriber station monitors whether a signal strength of a pilot, an identifier of which is a member of a Candidate Set, exceeds a pilot strength of a pilot an identifier of which is a member of the Active Set by a value of $T\_COMP_a$. Upon identifying such a pilot, the subscriber station makes a decision whether to add an identifier of the pilot to the Active Set.

If the transition method to a Candidate Set utilizes the threshold $T\_ADD_1$, and an expiration of timer interval T_TADD, the subscriber station may decide to add the pilot to the Active Set, once the pilot signal strength exceeds the signal strength of a pilot with the weakest signal strength already in an Active set by the value of T_COMP, regardless of whether the timer interval T_TADD expired or not.

The pilot is removed from the Active Set whenever the signal strength of the pilot is determined to be below $T\_DROP_a$ a period exceeding $T\_TDROP_a$.

Broadcast Service Handoff Control & Signaling

Because of the potential mobility of subscriber stations or changing conditions of the F-BSCH, the subscriber station may need to handoff form a coverage area of a original sector to a coverage area of a second sector. The method of performing the handoff depends on a state of the subscriber station in the coverage area of the original sector and the configuration of the original and the second sectors.

Upon a power-up, a subscriber station enters a system determination substate, in which the system upon which to perform an acquisition attempt is selected. In one embodiment, after having selected a system for system determination, the subscriber station transitions into a pilot acquisition sub-state, in which the subscriber station attempts to demodulate a pilot signal based on the acquisition parameters retrieved in the system determination sub-state. The subscriber station attempts to acquire a CDMA pilot signal in accordance with the acquisition parameters. When the subscriber station detects a pilot signal with energy above a predetermined threshold value, the subscriber station transitions into a Sync channel acquisition sub-state and attempts acquisition of the Sync channel. Typically, the Sync channel as broadcasted by the sectors includes basic system information such as the system identification (SID) and the network identification (NID), but most importantly provides timing information to the subscriber station. The subscriber station adjusts the subscriber's station timing in accordance with the Sync channel information and then enters the subscriber station idle state. The subscriber station begins the idle state processing by receiving a channel provided by the system for overhead messages identified in the Sync channel message, and if a sector, which the subscriber station acquired supports multiple frequencies, both the subscriber station and the sector use a hash function to determine, which frequency to use for communication. The subscriber and sector then use the hash function to determine a paging channel, which the subscriber monitors. In one embodiment, the hashing function accepts number of entities to hash, e.g., frequencies, paging channels, and the like and an international subscriber station identifier (IMSI) and outputs one entity.

In the idle state the subscriber station can receive messages, receive an incoming call, initiate a call, initiate registration, or initiate message transmission. Furthermore, a subscriber subscribed to an HSBS service may monitor an HSBS channel modulating a F-BSCH. The frequency determined by the hash function may or may not be modulated by F-BSCH. Consequently, if a subscriber station desires to monitor an HSBS channel modulating a F-BSCH on a frequency different form the frequency determined by the hash function, it must re-tune to the frequency modulated by the F-BSCH.

Based on the foregoing the subscriber station may be in the following states at the original sector:

State 1: not monitoring F-BSCH, and tuned to the frequency determined by the hash function;

State 2: not monitoring F-BSCH, and tuned to the frequency modulated by the F-BSCH different form the frequency determined by the hash function; and State 3: monitoring F-BSCH and, therefore, tuned to in the frequency modulated by the F-BSCH.

In accordance with one embodiment, the subscriber station determines the configuration of the second sector in accordance with a value of an HSBS neighbor configuration indicator (NGHBR_CONFIG_HSBS) transmitted by the current sector. Specific values of NGHBR_CONFIG_HSBS indicate, e.g., whether a HSBS configuration of the neighbor sector is known, whether the neighbor sector is transmitting the F-BSCH, whether the F-BSCH of the neighbor sector is being transmitted on the same frequency, whether the HSBS channels are synchronized, whether the same set of HSBS channels are being multiplexed in the same manner into the F-BSCH being transmitted in the neighbor sector, whether autonomous soft-handoff is allowed, and other configuration information known to one skilled in the art. In accordance with one embodiment, the NGHBR_CONFIG_HSBS is included in the Broadcast Service Parameters Message transmitted in the current sector.

When the subscriber station makes a decision to handoff to a second sector, the subscriber station ascertains the NGHBR_CONFIG_HSBS for the second sector. The subscriber station then takes action in accordance with the value of the NGHBR_CONFIG_HSBS. Several scenarios in accordance with above-listed examples of NGHBR_CONFIG_HSBS values are discussed. One of ordinary skills in the art recognizes that the scenarios discussed are communication system implementation dependent.

When the subscriber station is in state 1 or 2, the subscriber station is not concerned with the status of the F-BSCH. Consequently, the subscriber station receives a NGHBR_CONFIG_HSBS, and determines configuration parameters for the second sector. The subscriber station then performs idle handoff in accordance with an idle handoff method implemented in the communication system. In one embodiment, the idle handoff method uses the above-disclosed hashing methods to determine a frequency, the subscriber station tunes to and a paging channel the subscriber station starts monitoring. Alternatively, the subscriber station may choose to tune to the frequency modulated by the F-BSCH, even if the subscriber station is not interested in monitoring a HSBS channel at present, if sufficient information about the neighbor HSBS channels is available in the Broadcast Service Parameter Message of the current sector.

The NGHBR_CONFIG_HSBS received by the subscriber station in state 1 or 2 may indicate that configuration of the second subscriber station is unknown. In one embodiment, the subscriber station handoffs to a sector, for which NGHBR_CONFIG_HSBS indicates that a configuration is known. Alternatively, the subscriber station attempts to find non-broadcast related neighbor information. For example, communication systems in accordance with IS-95 and IS-2000 standards provide a neighbor configuration identifier (NGHBR_CONFIG), which indicates neighbor information, e.g., number of frequency assignment and paging channels. One of ordinary skills in the art recognizes that other communication systems may provide similar information. Consequently, the subscriber station need not initiate the full initialization process as described above, but acquires a frequency and a paging channel of the neighbor sector using the above-described hashing method in accordance with the neighbor information. If such information is not found or is inconclusive, the subscriber station must enter initialization process.

When a subscriber station in state 3 receives a NGHBR_CONFIG_HSBS indicating that a soft-handoff with the F-BSCH of the second sector is allowed, the subscriber station performs autonomous soft handoff if the subscriber station supports it. A soft handoff is allowed if both sectors belong to the same SHO group, the F-BSCH is being transmitted on the same frequency through both sectors, the same set of HSBS channels are being multiplexed identically onto the F-BSCH, and F-BSCH transmissions are synchronized. Alternatively, the subscriber station performs hard handoff in accordance with the described embodiments, acquires a new sector, and resumes monitoring the HSBS channel.

When a subscriber station in state 3 receives a NGHBR_CONFIG_HSBS indicating that the HSBS channel is available in the second sector but the transmissions are not synchronized among the sector, the subscriber station performs hard handoff. Because the two broadcast channels are identical, the subscriber station transitions directly to the HSBS channel frequency of the second sector and resumes monitoring HSBS channel. If the subscriber station failed to acquire all necessary parameters from the NGHBR_CONFIG_HSBS, the subscriber station performs a hard handoff, to the second sector, acquires a frequency and a paging channel of the second sector using the above-described hashing method in accordance with the neighbor information, determines information about the HSBS channel from the Broadcast Service Parameters Message, tunes to the HSBS channel frequency, and resumes receiving the HSBS channel.

The subscriber station in state 3 receives a NGHBR_CONFIG_HSBS indicating that the HSBS channel is available in the second sector, but the configuration parameters of the F-BSCH are different, e.g., the F-BSCH of the second sector is being transmitted on different frequency, set of HSBS channels multiplexed onto the F-BSCH channel is not identical or is not multiplexed in the same manner. The subscriber station performs a hard handoff to the second sector, acquires a frequency and a paging channel of the second sector using the above-described hashing method in accordance with the neighbor information, determines information about the HSBS channel from the Broadcast Service Parameters Message, tunes to the HSBS channel frequency, and resumes receiving the HSBS channel. Alternatively, if the subscriber station can determine the difference, which can be remedied by an action of the subscriber station, e.g., all parameters are identical, except the frequency, the subscriber station may transition directly to the HSBS channel frequency of the second sector and resume monitoring HSBS channel.

When a subscriber station in state 3 receives a NGHBR_CONFIG_HSBS indicating that the second sector is not transmitting a F-BSCH, in one embodiment, the subscriber station handoff to a sector transmitting a F-BSCH with a weaker, but acceptable, pilot signal. Alternatively, the subscriber station discontinues reception of the F-BSCH and performs idle handoff to the second sector in accordance with an idle handoff method implemented in the communication system. In one embodiment, the idle handoff method uses the above-disclosed hashing methods to determine a frequency the subscriber station tunes to and a paging channel the subscriber station starts monitoring.

Subscriber station is in state 3, NGHBR_CONFIG_HSBS indicates that configuration of the second sector is unknown. In one embodiment, the subscriber station handoffs to a sector, for which NGHBR_CONFIG_HSBS indicates that a configuration is known, regardless of whether a F-BSCH is transmitted or not. Alternatively, the subscriber station attempts to find non-broadcast related neighbor information. For example, communication system in accordance with IS-95 and IS-2000 standards provide a NGHBR_CONFIG, which indicates neighbor information, e.g., number of frequency assignment and paging channels. One of ordinary skills in the art recognizes that other communication systems may provide similar information. Consequently, the subscriber station need not initiate the full initialization process as described above, but acquires a frequency and a paging channel of the neighbor sector using the above-described hashing method in accordance with the neighbor information. If such information is not found or is inconclusive, e.g., unknown neighbors' configuration, the subscriber station must enter initialization process. Once the subscriber station acquires a new sector, the subscriber station can receive the Broadcast Service Parameter Message to determine availability of HSBS channels in that sector and tune to the appropriate frequency carrying the HSBS channel and resume receiving the HSBS channel.

Traffic Channel Handoff

Unlike the above-described embodiments, this embodiment contemplates a handoff for a subscriber station in the dedicated mode (e.g., in a voice call) on a traffic channel, while also monitoring a F-BSCH. In accordance with one embodiment of the present invention, the base station-subscriber station signaling assisted handoff is performed for the call. Furthermore, the handoff methods disclosed in the embodiments of the present invention are performed for the F-BSCH. The base station provides the subscriber station with a new pilot sets for the handoff on a traffic channel via a handoff direction messages. As discussed, the subscriber receives information about the pilot Sets via the Broadcast Service Parameter Message in accordance to one embodiment. However, the subscriber station is able to receives the Broadcast Service Parameter Message only in an idle state.

Consequently, in accordance with one embodiment, the handoff direction message indicates the pilot sets for both the traffic channel and the F-BSCH. As discussed, SHO groups determine the Active Set for a F-BSCH.

In accordance with another embodiment, no information pertaining to the F-BSCH is sent in the handoff direction message because the F-BSCH is not a dedicated channel. Rather, the F-BSCH SHO groups for each sector are sent via dedicated mode counterparts to overhead messages.

Note that whether the F-BSCH is soft-combined or not depends on the SHO groups involved (as advertised by the Broadcast Service Parameters Message) and is not related to whether the dedicated traffic channel is being soft-combined or not.

One skilled in the art will appreciate that although the flowchart diagrams are drawn in sequential order for comprehension, certain steps can be carried out in parallel in an actual implementation. Furthermore, unless indicate otherwise, method steps can me interchanged without departing form the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for handoff in a broadcast communication system, the method being operable by a subscriber station, comprising:
    receiving a list of sectors that broadcast data on a channel from one or more sectors that broadcast data on the channel;
    assigning each sector with a quality metric that exceeds a maximum threshold to an active set;
    assigning each sector with a quality metric that falls below a minimum threshold to an inactive set;
    monitoring the broadcasted data from each sector in the active set;
    assigning each sector with a quality metric that exceeds an intermediate threshold to a holding set; and
    assigning each sector in the holding set to the active set if the sector remains in the holding set for a time threshold.

2. The method of claim 1, further comprising receiving one or more subsequent lists of sectors from each sector in the active set after the assigning.

3. The method of claim 1, wherein the quality metric is one or more of a pilot signal strength, a bit error rate, and a packet error rate of a signal transmitted by a sector.

4. The method of claim 1, wherein the inactive set comprises a neighboring set comprising sectors with a quality metric that exceeds the minimum threshold and falls below the maximum threshold.

5. A subscriber station comprising:
    circuitry configured to receive a list of sectors that broadcast data on a channel from one or more sectors that broadcast data on the channel, assign each sector with a quality metric that exceeds a maximum threshold to the active set. assign each sector with a quality metric that falls below a minimum threshold to an inactive set, monitor the broadcasted data from each sector in the active set, assign each sector with a quality metric that exceeds an intermediate threshold to a holding set, and assign each sector in the holding set to the active set if the sector remains in the holding set for a time threshold.

6. The subscriber station of claim 5, wherein the circuitry is further configured to receive one or more subsequent lists of sectors from each sector in the active set after the assigning.

7. The subscriber station of claim 5, wherein the quality metric is one or more of a pilot signal strength, a bit error rate, and a packet error rate of a signal transmitted by a sector.

8. The subscriber station of claim 5, wherein the inactive set comprises a neighboring set comprising sectors with a quality metric that exceeds the minimum threshold and falls below the maximum threshold.

9. A subscriber station comprising:
    means for receiving a list of sectors that broadcast data on a channel from one or more sectors that broadcast data on the channel;
    means for assigning each sector with a quality metric that exceeds a maximum threshold to the active set;
    means for assigning each sector with a quality metric that falls below a minimum threshold to an inactive set;
    means for monitoring the broadcasted data from each sector in the active set;
    means for assigning each sector with a quality metric that exceeds an intermediate threshold to a holding set; and
    means for assigning each sector in the holding set to the active set if the sector remains in the holding set for a time threshold.

10. The subscriber station of claim 9, further comprising:
    means for receiving one or more subsequent lists of sectors from each sector in the active set after the assigning.

11. The subscriber station of claim 9, wherein the quality metric is one or more of a pilot signal strength, a bit error rate, and a packet error rate of a signal transmitted by a sector.

12. The subscriber station of claim 9, wherein the inactive set comprises a neighboring set comprising sectors with a quality metric that exceeds the minimum threshold and falls below the maximum threshold.

13. A tangible, non-transitory processor-readable medium for a handoff in a broadcast communication system, the processor-readable medium having processor-readable instructions stored thereon, comprising:
    instructions for receiving a list of sectors that broadcast data on a channel from one or more sectors that broadcast data on the channel;
    instructions for assigning each sector with a quality metric that exceeds a maximum threshold to the active set;
    instructions for assigning each sector with a quality metric that falls below a minimum threshold to an inactive set;
    instructions for monitoring the broadcasted data from each sector in the active set;
    instructions for assigning each sector with a quality metric that exceeds an intermediate threshold to a holding set; and
    instructions for assigning each sector in the holding set to the active set if the sector remains in the holding set for a time threshold.

14. The processor-readable medium of claim 13, wherein the instructions further comprise code for receiving one or more subsequent lists of sectors from each sector in the active set after the assigning.

15. The processor-readable medium of claim 13, wherein the quality metric is one or more of a pilot signal strength, a bit error rate, and a packet error rate of a signal transmitted by a sector.

16. The processor-readable medium of claim 13, wherein the inactive set comprises a neighboring set comprising sectors with a quality metric that exceeds the minimum threshold and falls below the maximum threshold.

* * * * *